July 22, 1952 J. D. BROOKS ET AL 2,604,440
DEHYDRATION OF AQUEOUS ISOPROPANOL
Filed Dec. 1, 1949
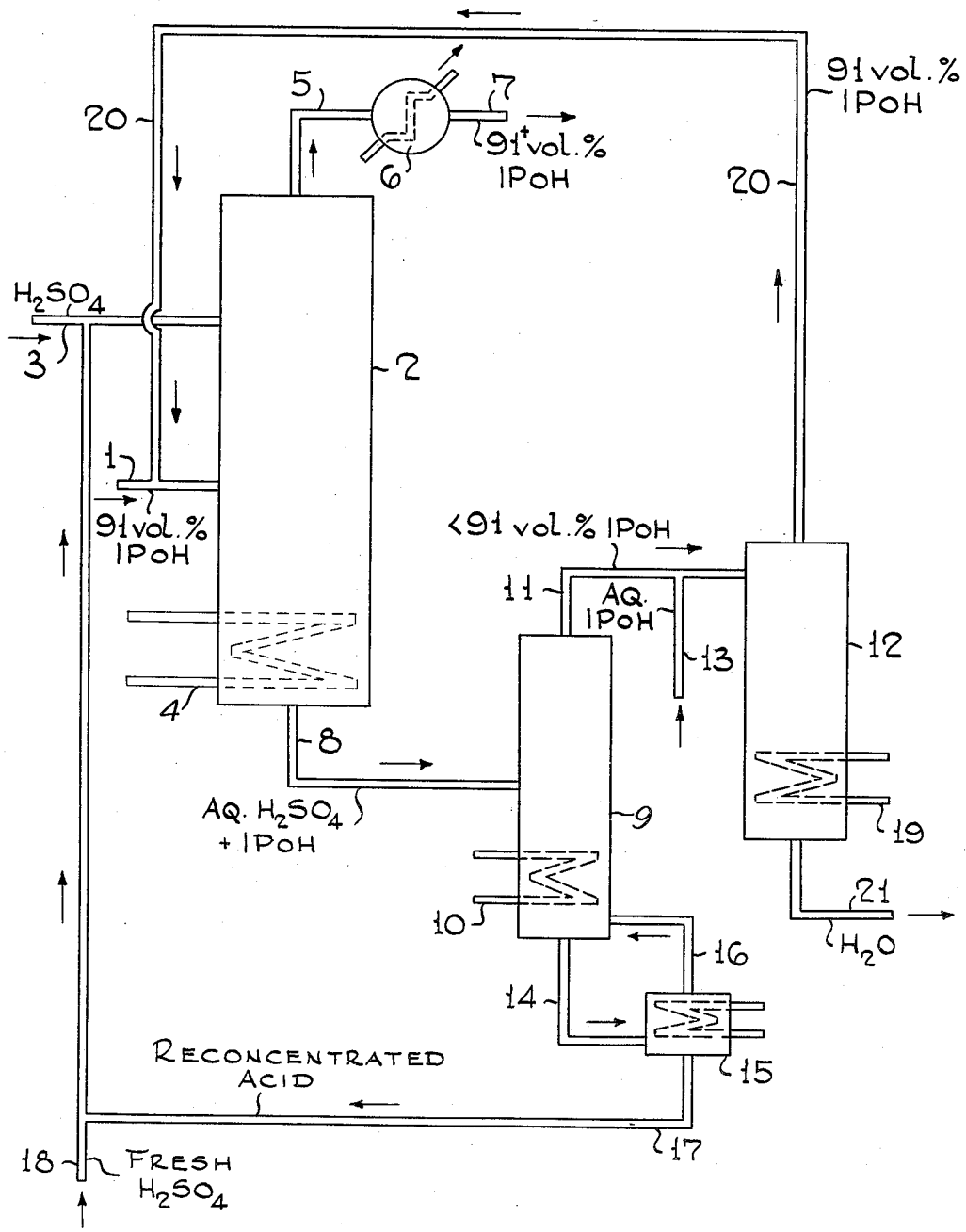
John D. Brooks
Henry O. Mottern Inventors
By Henry Berk Attorney Patented July 22, 1952

2,604,440

UNITED STATES PATENT OFFICE 2,604,440

DEHYDRATION OF AQUEOUS ISOPROPANOL

John D. Brooks, Roselle, and Henry O. Mottern, Bloomfield, N. J., assignors to Standard Oil Development Company, a corporation of Delaware Application December 1, 1949, Serial No. 130,556

6 Claims. (Cl. 202—68)

This invention relates to the removal of water from aqueous isopropanol. More particularly the invention relates to a process for drying isopropanol which comprises fractionally distilling aqueous isopropanol in the presence of 30 to 65 wt. % sulfuric acid. While the invention has for its purpose the reduction of the water content of aqueous isopropanol, it is particularly applicable to the drying of isopropanol-water azeotropes.

It is known that isopropanol forms a binary azeotrope with water. Attempts to separate isopropanol from water by ordinary distillation are hindered by the fact that the binary azeotrope distills over from the fractionating column.

It is an object therefore of this invention to provide a process for the removal of water from aqueous isopropanol.

It is also an object of this invention to provide a distillation process for breaking the isopropanol-water binary azeotrope whereby a vapor richer in isopropanol than the azeotrope will distill over from the distillation zone.

The invention will be more readily understood by reference to the accompanying drawing which is a diagrammatic flow plan of apparatus employed in one preferable embodiment of the invention.

Referring to the drawing numeral 2 represents a distillation column of the usual type equipped with suitable trays, bubble caps, etc. To the column there is fed via line 1 an aqueous isopropanol, for example aqueous isopropanol of the binary azeotrope composition, i. e., 91.3 vol. % isopropanol–8.7 vol. % water. The feed is introduced into column 2 at a point at or near its midpoint. Sulfuric acid is introduced into the top of the distillation column via line 3 at a point above the alcohol feed point. Heat is applied to the base of the column by suitable means such as by steam coil 4. During the distillation process the alcohol vapors pass up the column and are contacted countercurrently by the sulfuric acid which descends the column from its point of addition above. The acid extracts water from the alcohol vapors and thereby becomes diluted. It is essential however to maintain the concentration of the acid in contact with the alcohol in the column at a strength of 30 to 65 wt. %, preferably about 40 to 45 wt. %. If the acid falls below approximately 30 wt. % no dehydration of the isopropanol takes place, while if the acid strength exceeds approximately 65 wt. % chemical reaction of the alcohol to isopropyl ether and propylene and other materials occurs. Vapors of isopropanol richer in the alcohol than the binary azeotrope are removed from column 2 via line 5, condensed in condenser 6 and removed from the system via pipe 7.

There is withdrawn as bottoms from column 2 via line 8 a mixture of diluted aqueous sulfuric acid containing some small dissolved quantities of isopropanol, usually less than 1%. In breaking the isopropanol-water binary azeotrope it is preferred to add sulfuric acid of 60 to 65 wt. % concentration to the tower in amounts sufficient to maintain an aqueous acid bottoms in the tower of about 40–45 wt. % acid concentration. This latter mixture is led to distillation column 9 equipped with heating means 10 such as a closed steam coil. In tower 9 the mixture is distilled to strip therefrom isopropyl alcohol which is taken overhead via line 11. The overhead will contain less alcohol than is present in the aqueous azeotrope, that is, its content will be less than 91 vol. % isopropanol. The bottoms from this column is removed via line 14 and sent to reboiler 15 wherein the sulfuric acid is concentrated to the original strength of 30 to 65 wt. %. Steam resulting from the reconcentration is passed via line 16 into a point near the bottom of tower 9 in order to assist in the distillation of the acid-alcohol mixture. The reconcentrated acid is returned via line 17 to acid feed line 3. Fresh acid is added, if desired, via line 18. The aqueous alcohol recovered overhead via line 11 is fed to a third distillation column 12, heated by appropriate means, such as steam coil 19. Additional crude aqueous isopropanol, such as isopropanol of 60–70 vol. % concentration, may be added with this feed via line 13 or directly to column 12. In column 12 the isopropanol is concentrated to the binary azeotrope which is removed overhead via line 20 and returned to feed line 1. Excess water is removed from the system via line 21.

The nature and the concentration of the acid employed in this process is important. It has been found that benzene sulfonic acid cannot be substituted for the sulfuric acid. On the contrary isopropanol dehydrates the benzene sulfonic acid. Acid salts which act like acids in aqueous solution likewise do not function successfully. For example, aqueous solutions of sodium hydrogen sulfate when employed in the distillation process fail to produce an overhead alcohol containing more alcohol than the binary azeotrope. Sodium hydrogen phosphate in aqueous solution produced in the distillation process an alcohol overhead scarcely above the binary azeotrope composition.

Aqueous phosphoric acid, however, is suitable as a substitute for sulfuric acid. For example, a 45 wt. % solution of phosphoric acid when employed in the process produces an alcohol vapor containing more alcohol than the binary azeotrope. However, this acid is not as effective for the removal of water as is sulfuric acid.

The process cannot be applied analogously to other alcohols. For example, when attempts were made to remove water from aqueous ethanol employing either 45 wt. % sulfuric acid or 50% benzene sulfonic acid, it was discovered in each case that ethanol proved to be the better dehydrating agent. With secondary butanol, sulfuric acid of 35-65 wt. % concentration produced rapid decomposition of the alcohol to olefin. Lower concentrations of sulfuric acid were found to be ineffective for the removal of water.

The invention is illustrated by the following typical examples:

Example I 91.3 vol. % isopropanol was distilled in an ordinary 30 plate fractionation column. Sufficient sulfuric acid of 65 wt. % concentration was added to a point near the top of the column in countercurrent contact with the upflowing distilled isopropanol and water vapors to allow a final acid concentration of 45 wt. % on an alcohol free basis at the lower section of the column. Vapors containing 93.2 vol. % isopropanol were removed from the distillation column.

Example II

The above experiment was repeated with only sufficient 65 wt. % $H_2SO_4$ added to produce a final acid concentration of 30 wt. % in the lower section of the column below the alcohol feed plate. An alcohol vapor containing 92.93 vol. % isopropanol was obtained from the distillation zone.

Example III

The experiment of Example I was repeated adding only sufficient acid to produce a final acid concentration of 25 wt. % in the lower section of the column. An alcohol vapor was obtained containing 91.3 vol. % isopropanol which is the alcohol content of the aqueous binary azeotrope. This experiment indicates that 25 wt. % sulfuric acid is of insufficient strength to break the isopropanol-water binary azeotrope.

Example IV

In order to determine the decomposition effect of sulfuric acid on isopropanol, 99 vol. % isopropanol was boiled in a vapor liquid equilibrium still in the presence of 10 vol. % of 65 wt. % sulfuric acid and of 60 wt. % sulfuric acid. There was no evidence of olefin or ether formation or other decomposition product with the 60 wt. % acid and only very slight evidence of ether formation with 65 wt. % acid. Acid of strength greater than 65 wt. % should not be employed unless appreciable quantities of isopropyl ether can be tolerated in the isopropanol product.

Example V

A 90 vol. % aqueous isopropanol was boiled in a vapor-liquid equilibrium still in the presence of sulfuric acid maintained at 45 wt. % concentration. Vapors were obtained from the still containing 94.5 vol. % isopropanol. These vapors contained 3.2 vol. % more isopropanol than the binary azeotrope.

Example VI

The distillation of Example V was repeated employing an acid of 35 wt. % concentration. Vapors containing 93.13 vol. % isopropanol were obtained. These vapors are 1.83 vol. % richer in alcohol than the binary azeotrope.

Example VII

The distillation of Example V was repeated employing 45 wt. % $H_3PO_4$. Vapors containing 93.8 vol. % isopropanol were obtained. This distillate is 2.5 vol. % richer in isopropanol than the binary azeotrope.

What is claimed is:

1. A process for dehydrating an isopropanol-water binary azeotrope which comprises distilling the azeotrope in a distillation zone in the presence of 30-65 wt. % sulfuric acid, and removing from the distillation zone a distillate containing a greater proportion of isopropanol than is present in said azeotrope.

2. A process according to claim 1 in which the sulfuric acid is approximately 40-45 wt. %.

3. A process for dehydrating an isopropanol-water binary azeotrope which comprises passing the azeotrope in the vapor phase in a distillation zone countercurrently to and in contact with aqueous sulfuric acid of 30-65 wt. % acid concentration, and removing from the distillation zone a distillate containing a greater proportion of isopropanol than the binary azeotrope.

4. A process according to claim 3 in which the sulfuric acid is 40-45 wt. % concentration.

5. A process for producing isopropanol containing less water than the isopropanol-water binary azeotrope from aqueous isopropanol containing more water than the binary azeotrope which comprises, distilling the latter aqueous isopropanol in a distillation zone to remove therefrom a distillate comprising the isopropanol-water binary azeotrope, passing the azeotrope in the vapor phase in a second distillation zone countercurrently to and in contact with aqueous sulfuric acid of 30-65 wt. % acid concentration, and removing from the second distillation zone a distillate of isopropanol containing less water than the binary azeotrope.

6. A process according to claim 5 in which the sulfuric acid is of 40-45 wt. % concentration.

JOHN D. BROOKS.
HENRY O. MOTTERN.

REFERENCES CITED

The following references are of record in the file of this patent:

UNITED STATES PATENTS

| Number | Name | Date |
| --- | --- | --- |
| 1,184,926 | Collet | May 30, 1916 |
| 1,365,047 | Cohen et al. | Jan. 11, 1921 |
| 1,933,505 | Merley | Oct. 31, 1933 |
| 2,324,955 | Rupp et al. | July 20, 1943 |